Jan. 21, 1930.                D. MOOMAW                1,744,489
                            SPRING STRUCTURE
                           Filed Jan. 28, 1928
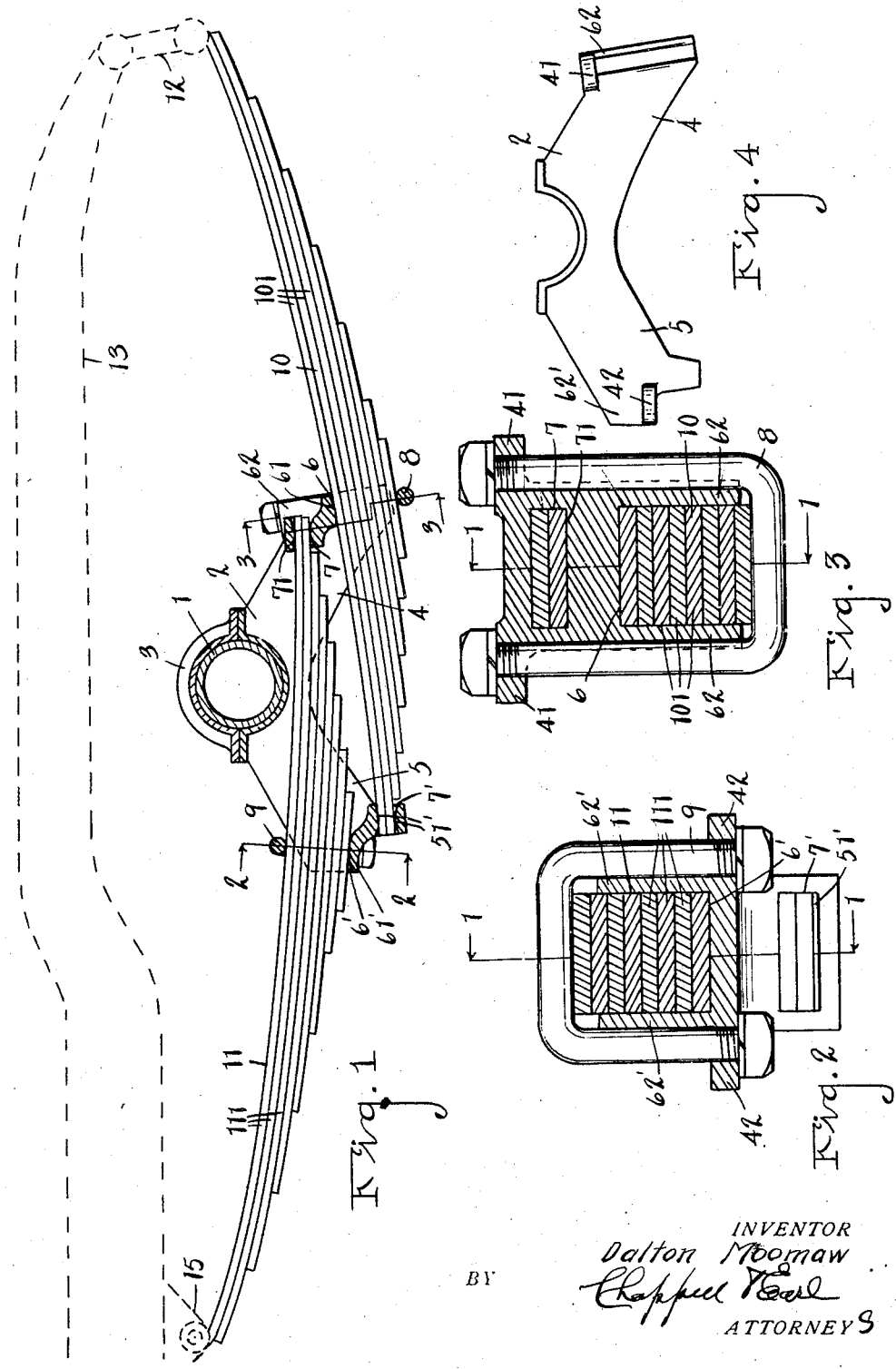
INVENTOR
Dalton Moomaw
BY
ATTORNEYS Patented Jan. 21, 1930

1,744,489

UNITED STATES PATENT OFFICE

DALTON MOOMAW, OF SOUTH BEND, INDIANA, ASSIGNOR OF ONE-HALF TO HOWARD M. LEONARD, OF SOUTH BEND, INDIANA

SPRING STRUCTURE

Application filed January 28, 1928. Serial No. 250,170.

This invention relates to improvements in vehicle spring structures especially adapted to automobiles.

The objects of the invention are:

First, to get the maximum spring benefit from the minimum amount of material.

Second, to eliminate the dead section of laminated springs, making all of the material of the spring working material.

Third, to eliminate the critical point or points of localized stresses in springs, thus permitting the spring to be designed, built and assembled to operate to secure uniform distribution of stress and uniform deformation following the arc of a circle.

Fourth, to provide in a spring structure separate overlapping spring members, making possible a gain in effective length of the spring without interference with the balance of the vehicle body or undue separation of the points of attachment.

Fifth, to provide a spring of such structure that the component parts may be readily assembled into springs of a wide range of characteristics.

Sixth, to provide improved clamping means for laminated spring structures.

Objects pertaining to details and economies of the invention will definitely appear from the description to follow. The invention is defined in the claims.

A structure embodying the features of my invention is clearly illustrated in the accompanying drawing in which:

Fig. 1 is a side elevation view of my improved spring structure with shackle, the vehicle chassis being indicated in dotted lines and the spring bracket being in vertical longitudinal section in the plane indicated by line 1—1 of Figs. 2 and 3.

Fig. 2 is an enlarged detail transverse sectional view of the front spring holder, parts being in elevation, taken on line 2—2 of Fig. 1.

Fig. 3 is an enlarged detail sectional elevation view of the rear spring holder taken on line 3—3 of Fig. 1.

Fig. 4 is a detail side elevation view of the detached spring bracket.

The parts will be identified by their numerals of reference which are the same in all the views.

1 is the axle or axle housing. 2 is the spring bracket retained by suitable clip 3 or otherwise. The spring bracket 2 has a rearwardly projecting arm 4 and forwardly projecting arm 5. The rearwardly projecting arm 4 is provided with a seat 6 for the spring having a curved upper bearing surface 61, and is provided with cheeks or sides 62 for embracing the spring 10 made up of blades 101. The spring is clamped against the curved seat 61 by the U clamp bolt 8, the spring being of such dimension as to project slightly beyond the cheeks 62. The bolt 8 extends through ears 41, 41 and is retained by the usual lock nuts. The inner end of the spring 10 is disposed in recess 7' in the lower end of the bracket 5, which is formed with curved bearing surfaces 51' above and below.

The spring 11, made up of blades 111, is disposed within the recess 6' in the forwardly projecting arm 5. The bearing surface 61' is curved and the recess is provided with cheeks 62'. The spring is held by the U bolt 9 which projects through ears 42. The spring 10 is connected by shackle 12 and spring 11 by bracket 15 to the chassis or frame 13.

The front spring 11 projects into recess 7 in the upper part of the spring seat 6, and this is provided with curved bearing surfaces 71.

The inner ends of the springs 10 and 11 are disposed one above the other in interlapping relation. Each blade is free to turn and is not clamped except at the exact point of engagement by the U bolt, and owing to the curved bearing surfaces it yields without localized stresses. The entire spring structure, therefore, has the effect of great added length as the full length of the overlapped springs is secured without any stiffening due to the clamping and the full spring value of each spring is secured, thus securing the effect of a single spring of more than the extreme length of the combined overlapped springs within the comparatively short length shown.

I desire to state that the structure is capable of great modification without departing from my invention. I have shown a laminated blade spring structure in which the combination is of special virtue. The arrangement is of advantage generally.

I desire to claim the invention in its specific form illustrated and also broadly as pointed out in the appended claims.

Having thus described my invention, what I claim as new and desire to secure by Letters Patent is:

1. In a vehicle spring structure the combination of a bracket connection to the axle or housing having forwardly and rearwardly projecting arms provided with clamping seats for the spring, having convex curved bearing portions and engaging recesses with convex curved bearings for the spring ends, laminated blade springs disposed in said seats with their inner ends in overlapping relation, U-shaped clamping bolts engaging the said springs in a restricted area and clamping the same against said curved bearing portions, and a connection for the end of each spring, coacting for the purpose specified.

2. In a vehicle spring structure the combination of a bracket connection to the axle or axle housing having forwardly and rearwardly projecting arms provided with clamping seats for the spring, having convex curved bearing portions and engaging recesses with curved bearings for the spring ends, laminated blade springs disposed in said seats with their inner ends in overlapping relation, and clamping means engaging the said springs in a restricted area and clamping the same against said curved bearing portions, coacting for the purpose specified.

3. In a vehicle spring structure, the combination of a bracket connection to the axle or axle housing having forwardly and rearwardly projecting arms provided with clamping seats for the spring, having convex curved bearing portions and engaging recesses with curved bearings for the spring ends, springs disposed in said seats with their inner ends in overlapping relation, and clamping means engaging the said springs in a restricted area and clamping the same against said curved bearing portions, coacting for the purpose specified.

4. In a spring structure, the combination of a laminated blade spring, a bracket with seat for said spring with convex curved bearing surface and a recess with curved bearing surfaces for one end of the spring, a U clamping bolt for clamping the spring in a restricted area opposite the curved bearing surface, and a connection for the spring.

5. In a spring structure, the combination of a laminated blade spring, a bracket with seat for said spring with convex curved bearing surface and a recess with curved bearing surfaces for one end of the spring, and a U clamping bolt for clamping the spring in a restricted area opposite the curved bearing surface.

6. In a spring structure, the combination of a laminated blade spring, a bracket with seat for said spring with curved bearing surface and a recess with curved bearing surfaces for one end of the spring, and means for clamping the spring in a restricted area opposite the curved bearing surface, as specified.

7. In a spring structure, the combination of a spring, a bracket with seat for said spring with convex curved bearing surface and a recess with bearing surfaces for one end of the spring, and means for clamping the spring in a restricted area opposite the convex curved bearing surface, as specified.

8. A spring structure comprising a pair of spring members and supports, the inner ends of which lie in overlapping relation, each member comprising a central bracket with forward and rearward bearing projections with seats for the spring members each with convex curved bearing surface and recesses with bearing surfaces for one end of each spring member, and means for clamping each spring member in a restricted area opposite the convex curved bearing surface, as specified.

In witness whereof I have hereunto set my hand.

DALTON MOOMAW.